(12) United States Patent
Tan et al.

(10) Patent No.: US 9,085,661 B1
(45) Date of Patent: Jul. 21, 2015

(54) PHOTOMECHANICALLY ACTIVE COPOLYIMIDES DERIVED FROM AN AZOBENZENEDIAMINE, A RIGID DIANHYDRIDE, AND A FLEXIBLE DIANHYDRIDE

(71) Applicant: The United States of America, as represented by the Secretary of the Air Force, Washington, DC (US)

(72) Inventors: Loon-Seng Tan, Centerville, OH (US); David Huabin Wang, Beavercreei, OH (US); Kyung Min Lee, Dayton, OH (US); Timothy J. White, Centerville, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 127 days.

(21) Appl. No.: 13/661,194

(22) Filed: Oct. 26, 2012

(51) Int. Cl.
*C08G 8/02* (2006.01)
*C08G 73/10* (2006.01)

(52) U.S. Cl.
CPC ........ *C08G 73/1007* (2013.01); *C08G 73/1096* (2013.01)

(58) Field of Classification Search
CPC ........... C08G 73/1007; C08G 73/1067; C08G 73/1096; C08G 73/1057; C08L 79/08; G02F 1/133723
USPC ............... 430/191, 192, 270.1; 528/170, 353, 528/125, 128, 310
See application file for complete search history.

(56) References Cited

U.S. PATENT DOCUMENTS

| | | | |
|---|---|---|---|
| 3,455,879 A | 7/1969 | Gay et al. | |
| 3,514,415 A | 5/1970 | Karol | |
| 3,600,361 A | 8/1971 | Heacock et al. | |
| 3,732,200 A | 5/1973 | Bach | |
| 3,763,211 A | 10/1973 | Heath et al. | |
| 3,835,120 A * | 9/1974 | Bach et al. | 528/128 |
| 3,925,312 A | 12/1975 | Fletcher | |
| 3,988,374 A | 10/1976 | Brode et al. | |
| 4,107,125 A | 8/1978 | Lovejoy | |
| 4,111,906 A | 9/1978 | Jones et al. | |
| 4,203,922 A | 5/1980 | Jones et al. | |
| 4,271,288 A | 6/1981 | Woo | |
| RE30,922 E | 5/1982 | Heilman et al. | |
| 4,394,499 A | 7/1983 | Robinson et al. | |
| 4,535,101 A | 8/1985 | Lee et al. | |
| 4,728,697 A | 3/1988 | Bolon et al. | |
| 4,797,466 A | 1/1989 | Oikawa et al. | |
| 4,981,497 A | 1/1991 | Hayes | |
| 5,101,005 A | 3/1992 | Vora et al. | |
| 5,101,037 A | 3/1992 | McGrath et al. | |
| 5,175,234 A | 12/1992 | Lubowitz et al. | |
| 5,205,894 A | 4/1993 | Ohta et al. | |
| 5,278,276 A | 1/1994 | Ohta et al. | |
| 5,300,559 A | 4/1994 | Sheehan et al. | |
| 5,344,894 A | 9/1994 | Lubowitz et al. | |
| 5,411,765 A | 5/1995 | Kanakarajan et al. | |
| 5,508,377 A | 4/1996 | Yamashita et al. | |
| 5,516,876 A | 5/1996 | Lubowitz et al. | |
| 5,585,217 A | 12/1996 | Oba | |
| 5,599,582 A | 2/1997 | Adamopoulous et al. | |
| 5,610,265 A | 3/1997 | Tan et al. | |
| 5,631,377 A | 5/1997 | Matsuo et al. | |
| 5,670,651 A | 9/1997 | Tan et al. | |
| 5,705,574 A | 1/1998 | Lubowitz et al. | |
| 5,891,581 A | 4/1999 | Simpson et al. | |
| 5,965,687 A | 10/1999 | Jensen | |
| 6,001,277 A | 12/1999 | Ichimura et al. | |
| 6,184,333 B1 | 2/2001 | Gray | |
| 6,262,223 B1 | 7/2001 | Meador et al. | |
| 6,307,008 B1 | 10/2001 | Lee et al. | |
| 6,379,809 B1 | 4/2002 | Simpson et al. | |
| 6,509,094 B1 | 1/2003 | Shah et al. | |
| 7,402,264 B2 | 7/2008 | Ounaies et al. | |
| 7,507,472 B2 | 3/2009 | Ounaies et al. | |
| 7,527,751 B2 | 5/2009 | Ounaies et al. | |
| 7,582,722 B1 | 9/2009 | Tan et al. | |
| 7,588,699 B2 | 9/2009 | Park et al. | |
| 7,678,873 B1 | 3/2010 | Tan et al. | |
| 7,906,043 B2 | 3/2011 | Connell et al. | |
| 7,935,414 B2 | 5/2011 | Ounaies et al. | |
| 7,972,536 B2 | 7/2011 | Connell et al. | |
| 8,034,893 B2 | 10/2011 | Akiba et al. | |
| 8,173,763 B1 | 5/2012 | Tan et al. | |
| 8,314,203 B2 | 11/2012 | Tsutsumi et al. | |
| 8,389,619 B1 | 3/2013 | Tan et al. | |
| 8,546,614 B1 | 10/2013 | Tan et al. | |

(Continued)

FOREIGN PATENT DOCUMENTS

| EP | 233069 | 8/1987 |
|---|---|---|
| EP | 333406 | 9/1989 |

(Continued)

OTHER PUBLICATIONS

Jenekhe, Samson A., et al., Nonlinear Optical Properties of Poly(p-phenylenebenzobisoxazole), Chem. Mater. 1992, 4, 683-687.

Kannan, Ramamurthi, et al., Diphenylaminofluorene-Based Two-Photon Absorbing Chromophores with Various π-Electron Acceptors, Chem. Mater. 2001, 13, 1896-1904.

Pyun, Eumi, et al., "Kinetics and mechanisms of thermal imidization of a polyamic acid studied by ultraviolet-visible spectroscopy", Macromolecules (1989), 22(3), 1174-83.

Natansohn, A., et al., "Photoinduced Motions in Azo-Containing Polymers," Chemical Reviews (Washington, DC, United States) (2002), 102(11), 4139-4175.

(Continued)

*Primary Examiner* — Gregory Listvoyb

(74) *Attorney, Agent, or Firm* — AFMCLO/JAZ; James Carey

(57) ABSTRACT

Compositions of azobenzene-containing, photomechanically active, copoly(amic acids) and linear copolyimides comprising an azobenzenediamine, a rigid dianhydride, and a flexible dianhydride; and methods of making the same.

14 Claims, 5 Drawing Sheets

(56) References Cited

U.S. PATENT DOCUMENTS

| | | | |
|---|---|---|---|
| 8,633,284 | B2 | 1/2014 | Ronk et al. |
| 8,785,589 | B1 | 7/2014 | Tan et al. |
| 8,791,227 | B1 | 7/2014 | Tan et al. |
| 2003/0064235 | A1 | 4/2003 | Okawa et al. |
| 2004/0233377 | A1 | 11/2004 | Utsumi et al. |
| 2005/0080229 | A1 | 4/2005 | Deets et al. |
| 2006/0057377 | A1 | 3/2006 | Harrison et al. |
| 2006/0217482 | A1 | 9/2006 | Lukehart et al. |
| 2006/0235194 | A1 | 10/2006 | Kato |
| 2006/0270825 | A1 | 11/2006 | Angermeier et al. |
| 2007/0106056 | A1 | 5/2007 | Itatani et al. |
| 2007/0270562 | A1 | 11/2007 | Yamada et al. |
| 2007/0272124 | A1 | 11/2007 | Tsutsumi et al. |
| 2008/0025905 | A1 | 1/2008 | Wang et al. |
| 2008/0311303 | A1 | 12/2008 | Naiki et al. |
| 2009/0220722 | A1 | 9/2009 | Wang |
| 2010/0048745 | A1 | 2/2010 | Yamada et al. |
| 2011/0009513 | A1 | 1/2011 | Chaudhary et al. |
| 2011/0136061 | A1 | 6/2011 | Itatani et al. |

FOREIGN PATENT DOCUMENTS

| | | | |
|---|---|---|---|
| EP | 659802 | | 6/1995 |
| EP | 397023 | | 1/2009 |
| GB | 1147856 | * | 4/1969 |
| JP | 2005023151 | | 1/2005 |
| JP | 2005154643 | | 6/2005 |
| JP | PCTJP2007051217 | | 2/2007 |
| SE | EP 2 380 867 A1 | | 10/2011 |
| WO | 2009013376 | | 1/2009 |

OTHER PUBLICATIONS

Hugel, Thorsten, et al., "Single-molecule optomechanical cycle", Science (2002), 296(5570), 1103-1106.
Kannan, Ramamurthi, et al., "Toward Highly Active Two-Photon Absorbing Liquids: Synthesis and Characterization of 1,3,5-Triazine-Based Octupolar Molecules," Chem. Mater. 2004, 16, 185-194.
He, Guang S., et al., "Degenerate Two-Photon-Absorption Spectral Studies of Highly Two-Photon Active Organic Chromophores," J. Chem. Phys., vol. 120 No. 11 (2004) 5275-5284.
Hrozhyk, Uladzimir, et al., "Bidirectional Photoresponse of Surface Pretreated Azobenzene Liquid Crystal Polymer Networks," Optics Express, vol. 17, Issue 2, pp. 716-722 (2009).
Usami, Kiyoaki, et al., "Photo-Aligned Blend Films of Azobenzene-Containing Polyimides with and without Side-Chains for Inducing Inclined Alignment of Liquid Crystal Molecules," Journal of Applied Physics (2011), 110(4), 043522/1-043522/6.
Makita, Shonei, et al., "Synthesis of Alkaline-Developable, Photosensitive Hyperbranched Polyimides through the Reaction of Carboxylic Acid Dianhydrides and Trisamines," Journal of Polymer Science Part A: Polymer Chemistry, vol. 42, 3697-3707 (2004).
Lendlein Andreas et al., "Shape-Memory Polymers," Angewandte Chemie, International Edition, vol. 41, 2034-2057 (2002).
Liu C. et al., "Review of Progress in Shape-Memory Polymers," Journal of Materials Chemistry, vol. 17, 1543-1558 (2007).
Fay, Catherine C. et al., "Molecularly Oriented Polymeric Thin Films for Space Applications," High Performance Polymers, vol. 11, 145-156 (1999).
SRS Technologies and Mantech Materials, "Polyimides: CP1 and CP2 Film Properties," printed Jul. 9, 2012, 1 page, available at <http://www.mantechmaterials.com/_images/documents/3_8_doc.pdf>.
St. Clair, Anne K., et al. "Synthesis and Characterization of Essentially Colorless Polyimide Films," J. Polym. Mater. Sci Eng., vol. 51, pp. 62-66 (1984).
Miner, Gilda A., et al., "The Wettability of LaRC Colorless Polyimide Resins on Casting Surfaces," J. Polym. Mater. Sci Eng., vol. 76, pp. 381-382 (1997).
Straub, Daniel, "Lewis Structures of Boron Compounds Involving Multiple Bonding," J. Chem. Ed. 72(6) 494-497 (1995).
Chao, Tsung-Yi, et al., "Nonlinear Optical Polyimide/Montmorillonite/Nanocomposites Consisting of Azobenzene Dyes," Dyes and Pigments, 77 (2008) 515-524.
Lovrien, R., "The Photoviscosity Effect," Proc. Natl. Acad. Sci. U.S.A. 1967 (57) 236-242.
Cojocariu, C., et al., "Light-induced motions in azobenzene-containing polymers," Pure Appl. Chem. 2004, 76, 1479-1497.
Tabiryan, N., et al., "Polymer film with optically controlled form and actuation," T. Optics Express 2005, 13, 7442-7448.
White, T.J., et al., "A high frequency photodriven polymer oscillator," J. Soft Matter 2008,4, 1796-1798.
Barrett, C.J., et al., "Photo-mechanical effects in azobenzene-containing soft materials," Soft Matter 2007, 3, 1249-1261.
Park, C., et al., "Actuating Single Wall Carbon Nanotube-Polymer Composites: Intrinsic Unimorphs," Adv. Mater. 2008, 20, 2074-2079.
Van Oosten, C.L., et al., "Bending Dynamics and Directionality Reversal in Liquid Crystal Network Photoactuators," Macromolecules 2008,41,8592-8596.
Irie, M., "Photochromism and Molecular Mechanical Devices," Bull. Chem. Soc. Jpn. 2008, 81 (8), 917-926.
Serak, S.V., et al., "Azobenzene liquid crystal polymer-based membrane and cantilever optical systems," Optics Express, vol. 17, No. 18 (Aug. 31, 2009), 15736-15746.
Hogan, P.M., et al., "UV-Manipulation of Order and Macroscopic Shape in Nematic Elastomers," Phys. Rev. E: Stat., Nonlinear, Soft Matter Phys. 2002, 65, 041720/1-041720110.
Eisenbach, C.D., "Isomerization of aromatic azo chromophores in poly(ethyl acrylate) networks and photomechanical effect," Polymer 1980, 21, 1175-1179.
Viswanathan, N.K., et al., "Surface relief structures on azo polymer films," J. Mater. Chem. 1999, 9, 1941-1955.
Harris, K.D., et al., Large amplitude light-induced motion in high elastic modulus polymer actuators, J. Mater. Chem. 2005, 15, 5043-5048.
Van Oosten, C.L., et al., "Glassy photomechanical liquid-crystal network actuators for microscale devices," Eur. Phys. J. E, 2007, 23, 329-336.
White, T.J., et al., "Polarization-controlled, photodriven bending in monodomain liquid crystal elastomer cantilevers," J. Mater. Chem. 2009, 19, 1080-1085.
Finkelmann, H., et al., "A New Opto-Mechanical Effect in Solids," Phys. Rev. Lett. 2001, 87, 01550111-01550114.
Sroog, C.E., "Polyimides," Prog. Polym. Sci. 1991, 16, 561-694.
Koerner, H., et al., "Photogenerating work from polymers," Mater. Today (Oxford, U. K.) 2008, 11, (7-8), 34-42.
Wang, D.H., et al., "Nanocomposites Derived from a Low-Color Aromatic Polyimide (CP2) and Amine-Functionalized Vapor-Grown Carbon Nanofibers: In Situ Polymerization and Characterization," Macromolecules 2007, 40, 6100-6111.
Yu, Y., et al., "Photomechanical Effects of Ferroelectric Liquid-Crystalline Elastomers Containing Azobenzene Chromophores," Angew. Chem., Int. Ed. 2007, 46, 881-883.
Arlen, M., et al., "Thermal-Electrical Character of in Situ Synthesized Polyimide-Grafted Carbon Nanofiber Composites," Macromolecules 2008, 41, 8053-8062.
Chen, J.P., et al., "Highly Stable Optically Induced Birefringence and Holographic Surface Gratings on a New Azocarbazole-Based Polyimide," Macromolecules 1999, 32, 8572-8579.
Kumar, G.S., et al., "Photochemistry of Azobenzene-Containing Polymers," Chem. Rev. 1989, 89, 1915-25.
Yu, Y., et al., "Effect of Cross-linking Density on Photoinduced Bending Behavior of Oriented Liquid-Crystalline Network Films Containing Azobenzene," Chem. Mater. 2004, 16, 1637-1643.
Kondo, M., et al., "Effect of concentration of photoactive chromophores on photomechanical properties of crosslinked azobenzene liquid-crystalline polymers," J. Mater. Chem. 2010, 20, 117-122.
Li, M.-H., et al., "tight-Driven Side-On Nematic Elastomer Actuators," Adv. Mater. 2003, 15, 569-572.
U.S. Patent and Trademark Office, Non-Final Office Action mailed Feb. 10, 2014, U.S. Appl. No. 13/866,551, 5 pages.

(56) References Cited

OTHER PUBLICATIONS

Georgiev, A., et al, "Polyimide Coatings Containing Azo-Chromophores as Structural Units," Journal of Physics, Conference Series vol. 113 No. 1 (2008) 012032.
Koshiba, Yasuko, et al., "Photo-Induced Alignment Behavior of Azobenzene Compound in Thin Film," Thin Solid Films, 518, pp. 805-809 (2009).
Sakamoto, Kenji, et al., "Highly Polarized Polymer-Based Light Emitting Diodes Fabricated by Using Very Thin Photoaligned Polyimide Layers," Journal of Applied Physics 107, 113108 (2010).
Sakamoto, Kenji, et al., "Light Exposure Dependence of Molecular Orientation of Glassy Polyfluorene Layers Formed on Photo-Aligned Polyimide Films," Colloids and Surfaces B: Biointerfaces 56, pp. 260-264 (2007).
Usami, Kiyoaki, et al., "Improvement in Photo-Alignment Efficiency of Azobenzene-Containing Polyimide Films," Thin Solid Films 518, pp. 729-734 (2009).
Usami, Kiyoaki, et al., "Pretilt Angle Control of Liquid Crystal Molecules by Photoaligned Films of Azobenzene-Containing Polyimide with Different Content of Side-Chain," Journal of Applied Phyics 104, 113528 (2008).
Lee, Kyung Min, and White, Timothy J., "Photomechanical Response of Composite Structures Built from Azobenzene Liquid Crystal Polymer Networks," Polymers (2011), 3, 1447-1457.
Wang, David H., et al., "Photomechanical Response of Glassy Azobenzene Polyimide Networks," Macromolecules (2011), 44, 3840-3846.
Agolini, F., and Gay, F.P., "Synthesis and Properties of Azoaromatic Polymers," Macromolecules (May-Jun. 1970), vol. 3, No. 3, 349-351.
Hosono, Nobuhiko, et al., "Photochemical Control of Network Structure in Gels and Photo-Induced Changes in Their Viscoelastic Properties," Colloids and Surfaces B: Biointerfaces, 56 (2007) 285-289.
Zhang, Chaohui, et al., "Rapid Bending of a Nonliquid Crystal Azobenzene Polymer Film and Characteristics of Surface Relief Grating," Journal of Applied Polymer Science (2009), vol. 113, Issue 2, 1330-1334.
Lee, Kyung Min, et al., "Relationship between the Photomechanical Response and the Thermomechanical Properties of Azobenzene Liquid Crystalline Polymer Networks," Macromolecules (2010) 43, 8185-8190.
Amaranatha Reddy et al., "Occurrence of the B7 mesophase in two homologous series of seven-ring achiral compounds composed of banana-shaped molecules," Liq. Cryst., vol. 30 (2003) 273-283.
Behl et al., "Shape-memory polymers," Mater. Today, vol. 10 (2007) 20-28.
Gonzalo et al., "Synthesis, Characterization, and Thermal Properties of Piezoelectric Polyimides," J. Polym. Sci. Part A: Polym. Chem., vol. 47 (2009) 722-730.
Hamciuc et al., "Aromatic polyimides containing polar nitrile groups," Revue Rourmaine de Chimie, vol. 51 (2006) 765-771.
Hamciuc et al., "Study of thin films made from poly(amide-imide)s containing nitrile groups," Int'l. Semicond. Conf., vol. 2 (2010) 341-344.
Hamciuc et al., "Hybrid films based on a polyimide containing nitrile groups and barium and titanium oxides," High Perf. Polym., vol. 22 (2010) 225-236.
Hamciuc et al., "Aromatic poly(ether imide)s containing nitrile groups," High Perf. Polym., vol. 21 (2009) 205-218.
Hergenrother, "Recent Developments in High Temperature Organic Polymers," Polyimides and Other High-Temperature Polymers, Abadie, M.J.M. and Sillion, B., Eds., Elsevier: New York, 1991, pp. 1-18.
Jacobs et al., "Dielectric characteristics of polyimide CP2," Polym., vol. 51 (2010) 3139-3146.
Jeong et al., "Adhesion property of novel polyimides containing fluorine and phosphine oxide moieties," J. Adh. Sci. Technol., vol. 15 (2001) 1787-1803.
Kang et al., "Synthesis and characterization of polyimides from unsymmetrical diamine with cyano groups," Polym. J., vol. 33 (2001) 284-289.
Klein et al., "Synthesis and characterization of polyimides derived from cyano-containing 1,4-bis(4-aminophenoxy) benzene monomers," Polym. Bull., vol. 59 (2007) 1-12.
Koerner et al., "Photogenerating work from polymers," Mater. Today, vol. 11 (2008) 34-42.
Koerner et al., "Polymer design for high temperature shape memory: low crosslink density polyimides," Polymer, vol. 54 (2013) 391-402.
Koton et al, "Polyimides containing different heterocyclic unites in the main chain," Chem. Abstr. 20532k, vol. 96 (1982).
Koton et al, "Polyimides containing various heterocyclic main-chain units," Polym. Sci., vol. 23 (1981) 1909-1915.
Lee et al., "Enhancement of photogenerated mechanical force in azobenzene-functionalized polyimides," Angew. Chem., vol. 124 (2012) 4193-4197.
Li et al., "Synthesis and characterization of new polyimides containing nitrile groups," High Perf. Polym., vol. 17 (2005) 135-147.
Liaw et al., "High glass transitions of new polyamides, polyimides, and poly(amide-imide)s containing a triphenylamine group: synthesis and characterization," Macromol., vol. 35 (2002) 4669-4676.
Liaw et al., "Novel organosoluble poly(pyridine-imide) with pendent pyrene group: synthesis, thermal, optical, electrochemical, electrochromic, and protonation characterization," Macromol., vol. 40 (2007) 3568-3574.
Liaw et al., "Novel poly(pyridine imide) with pendent naphthalene groups: synthesis and thermal, optical, electrochemical, electrochromic, and protonation characterization," J. Polym. Sci. Part A: Polym. Chem., vol. 45 (2007) 2367-2374.
Machine, Translation of WO 2009/013376 as provided by WIPO PATENTSCOPE, Powered by Google Translate, accessed on Sep. 30, 2014.
Machine, Translation of JP 2005-023151 as provided by Patent Abstracts of Japan, accessed on Oct. 6, 2014.
Machine, Translation of JP 2005-154643 as provided by Patent Abstracts of Japan, accessed on Sep. 10, 2013.
Meador et al., "Improvements to the synthesis of polyimide aerogels," ACS spring Meeting (2011) 34 pages total.
Meador et al., "Synthesis and properties of nanoporous polyimide aerogels having a covalent bonded network structure," Polym. PrePrints, vol. 51 (2010) 265-266.
Mercer et al., "Synthesis and properties of new alternating copolyethers containing pendent cyano groups," Polym., vol. 34 (1994) 5355-5363.
Ounaies et al., "Structure-property study of piezoelectricity in polyimides," Proc. SPIE, vol. 3669 (1999) 171-178.
Park et al., "In situ poling and imidization of amorphous piezoelectric polyimides," Polym., vol. 45 (2004) 5417-5425, as provided in ICASE Report No. 2002-39.
Rabani et al., "Synthesis and characterization of two shape-memory polymers containing short aramid hard segments and poly(e-caprolactone) soft segments," Polymer, vol. 47 (2006) 4251-4260.
Saxena et al., "Synthesis and characterization of polyamides and poly(amide-imide)s derived from 2,6-bis(3-aminophenoxy)benzonitrile or 2,6-bis(4-aminophenoxy)benzonitrile," Polym. Int'l., vol. 54 (2005) 544-552.
Schuh et al., "Shape-memory properties of segmented polymers containing aramid hard segments and polycaprolactone soft segments," Polymers, vol. 2 (2010) 71-85.
Shumaker et la., "Synthesis of high temperature polyaspartimide-urea based shape memory polymers," Polymer, vol. 53 (2012) 4637-4642.
Sinou et al., "Synthesis of family of triarylphosphanes with fluorous phase affinity," Eur. J. Org. Chem., Vol. (2002) 269-275.
Tan et al., "Multi(azobenzene-amine) photoactive crosslinkers and methods of making the same," U.S. Appl. No. 13/866,524, filed Apr. 19, 2013.
Tyan et al., "Effect of reactivity of organics-modified montmorillonite on the thermal and mechanical properties of montmorillonite/polyimide nanocomposites," Chem. Mater., vol. 13 (2001) 222-226.

(56) References Cited

OTHER PUBLICATIONS

United States Patent and Trademark Office, Non-Final Office Action in U.S. Appl. No. 13/557,326, mailed Sep. 26, 2012, 9 pages total.
United States Patent and Trademark Office Non-Final Office Action in U.S. Appl. No. 13/557,326, mail Mar. 27, 2013, 5 pages total.
United States Patent and Trademark Office Non-Final Office Action in U.S. Appl. No. 13/546,439, mailed Nov. 7, 2013, 9 pages total.
United States Patent and Trademark Office Non-Final Office Action in U.S. Appl. No. 14/013,090, mailed Aug. 22, 2014, 9 pages total.
Wang et al., "High-temperature dielectric polyimide films for energy storage applications," MRS Online Proc. Lib., vol. 1541 (2013) 6 pages total.
Wang et al., "Synthesis of symmetric and asymmetric polyimides containing benzonitrile groups for dielectric applications," Polym. Prints, vol. 51 (2010) 522-533.
Wang et al., "Synthesis and characterization of unsymmetrical benzonitrile-containing polyimides: viscosity-lowering effect and dielectric properties," J. Polym. Sci. Part A: Polym. Chem., vol. 51 (2013) 4998-5100.
Whitaker et al., "Synthesis and solid-state structure of substituted arylphosphine oxides," J. Org. Chem., vol. 60 (1995) 3499-3508.
Xie "Recent advances in polymer shape memory," Polymer, vol. 52 (2011) 4985-5000.
Young et al., "Molecular modeling of the poling of piezoelectric polyimides," Polym., vol. 40 (1999) 2787-2795.

* cited by examiner

Azo-PI-PMDA (x = 1.0)   Azo-PI-6FDA (x = 0)

Azo-coPI-xx (xx = 0.25, 0.50, and 0.75)

Azo-PI-6FDA

Azo-PI-PMDA

PHOTOMECHANICALLY ACTIVE COPOLYIMIDES DERIVED FROM AN AZOBENZENEDIAMINE, A RIGID DIANHYDRIDE, AND A FLEXIBLE DIANHYDRIDE

RIGHTS OF THE GOVERNMENT

The invention described herein may be manufactured and used by or for the Government of the United States for all governmental purposes without the payment of any royalty.

BACKGROUND OF THE INVENTION

1. Field of the Invention

This invention relates generally to the field of photomechanically active polymers. More particularly, it relates to azobenzene-containing, photomechanically active, imide copolymers derived from copolymerization of an azobenzenediamine together with a rigid dianhydride and a flexible dianhydride; and methods of making the same.

2. Description of the Related Art

Photomechanical polymers are a special class of smart polymers that are responsive to light and are capable of generating photo-directed motions and dimensional or shape alteration at the macro-scale level. The possibility of light-transduced mechanical work was first demonstrated in the literature in the mid-1960s, and since then, considerable effort has been undertaken in the synthesis of photoresponsive polymers and the characterization of their photomechanical output. The photo-directed motion and/or alteration of photomechanical polymers are driven by the collective molecular-volume change brought about by the structural rearrangement of chromophoric units upon appropriate irradiation. The chromophoric units in photoresponsive polymers are photochromic and have the unique ability to reversibly interconvert between two structural isomers (each with distinctly different optical and physical properties) under appropriate excitation conditions. Examples of chromophoric units can be found in photo-isomerizable molecules such as azobenzenes, spiropyrans, spirooxazines, diarylethylenes and fulgides. Azobenzenes are one of the most-utilized photochromic units because of their excellent thermal stability, resolved isomeric forms, and unique optical nonlinearities, as well as their ability to form surface reliefs when subjected to conventional or polarization holography. The resulting photomechanical output of a polymeric material is dependent not only on its optical properties (absorption wavelength, wavelength of exposure, polarization of exposure) but also on its molecular architecture and morphology (amorphous, crystalline, liquid crystalline) and thermomechanical properties, as well as the geometrical properties of the device, e.g. thickness of a cantilever.

Many photoresponsive polymers comprise liquid crystalline polymer networks (LCN; both glasses and elastomers), and recent reports have characterized the photomechanical and thermomechanical responses of LCN for comparatively large magnitude responses typified by bending of cantilevers or dramatic uniaxial contractions of thin films. Notably, a majority of these efforts have characterized the response of azobenzene-based LCN to exposure to UV light, which is known to decrease the order of the LCN through trans-cis photoisomerization and can result in an isothermal phase transition. UV-induced responses in azobenzene LCN are limited due to the need for multiple light sources to reverse the trans-cis isomerization.

Polyimides (PIs) represent an important class of heat-resistant polymers useful in a wide variety of applications due to their unique combination of physical properties, thermal stability, and processability, and photoresponsive polyimides and copolyimides have also been the subject of several recent reports. For example, PIs containing azobenzene in the backbone or side-chain have been investigated for photo-induced alignment in liquid crystal display (LCD), as well as nonlinear optical applications. Several cross-linked azopolyimides have also been described and reported to be photomechanically active.

SUMMARY OF THE INVENTION

The present invention includes a copoly(amic acid) having photomechanical properties with the following general formula:

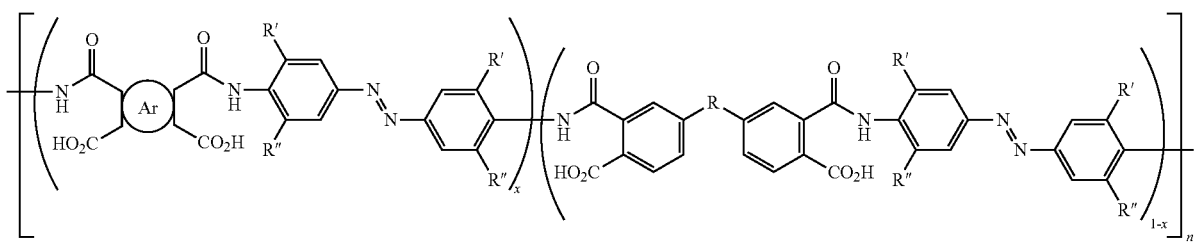

in which Ar is 1,2,4,5-benzene (pyromellitic), 1,4,5,8-naphthalene, and/or 3,3',4,4'-biphenyl; R is —C(CF$_3$)$_2$—, —O—, >C=O, >SO$_2$, —OPh-C(CF$_3$)$_2$—PhO—, —OPh-C(CH$_3$)$_2$—PhO—, >C(CF$_3$)Ph, —O(1,3-Ph)O—, and/or —O(1,4-Ph)O—; when R' and R" are identical, they are —H, —F, —Cl, or —CH$_3$, and when R' and R" are different, R' is —H and R" is —F, —Cl, —CH$_3$, —CF$_3$, and/or —OCH$_3$; and 0≤x≤1.0. In one embodiment of the copoly(amic acid), n is between 100 and 500.

The present invention further includes a copolyimide having photomechanical properties comprising an azobenzenediamine, a rigid dianhydride, and a flexible dianhydride, the copolyimide having the general formula:

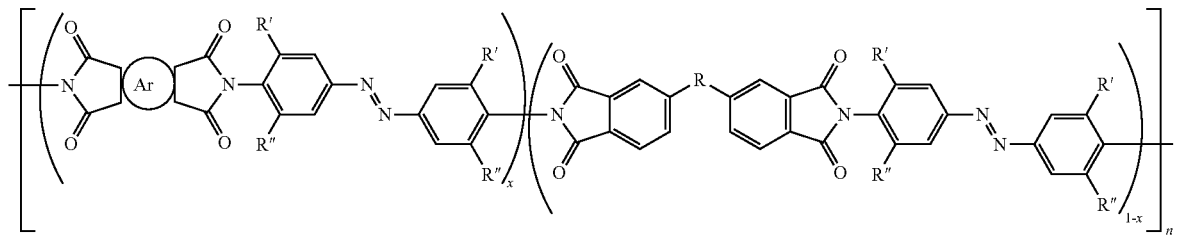

in which Ar is 1,2,4,5-benzene (pyromellitic), 1,4,5,8-naphthalene, and/or 3,3',4,4'-biphenyl; R is —C(CF$_3$)$_2$—, —O—, >C=O, >SO$_2$, —OPh-C(CF$_3$)$_2$—PhO—, —OPh-C(CH$_3$)$_2$—PhO—, >C(CF$_3$)Ph, —O(1,3-Ph)O—, and/or —O(1,4-Ph)O—; when R' and R" are identical, they are —H, —F, —Cl, or —CH$_3$, and when R' and R" are different, R' is —H and R" is —F, —Cl, —CH$_3$, —CF$_3$, and/or —OCH$_3$; and 0≤x≤1.0. In one embodiment of the copolyimide, n is between 100 and 500. In another embodiment, 0.05≤x≤0.50.

The azobenzenediamine may be 4,4'-diaminoazobenzene, 3-fluoro-4,4'-diaminoazobenzene, 3-chloro-4,4'-diaminoazobenzene, 3-methyl-4,4'-diaminoazobenzene, 3-trifluormethyl-4,4'-diaminoazobenzene, 3-methoxy-4,4'-diaminoazobenzene, 3,3'-fluoro-4,4'-diaminoazobenzene, 3,3'-chloro-4,4'-diaminoazobenzene, and/or 3,3'-methyl-4,4'-diaminoazobenzene. The flexible dianhydride may be 2,2-bis(phthalic anhydride)-1,1,1,3,3,3-hexafluoroisopropane, 4,4'-oxydi(phthalic anhydride), 3,3',4,4'-diphenylsulfone tetracarboxylic dianhydride, 3,3',4,4'-benzophenone tetracarboxylic dianhydride, 2,2-bis[4-(3,4-dicarboxyphenoxyl)phenyl]hexafluoropropane dianhydride, 2,2-bis[4-(3,4-dicarboxyphenoxyl)phenyl]propane dianhydride, 4,4'-(2,2,2-trifluoro-1-phenylethylidene)diphthalic anhydride, 2,2'4,4'-(p-phenylenedioxy)diphthalic anhydride, and/or 4,4'-(m-phenylenedioxy)diphthalic anhydride. The rigid dianhydride may be pyromellitic dianhydride, 1,4,5,8-naphthalenetetracarboxylic acid dianhydride, and/or 1,1'-biphenyl-3,3',4,4'-tetracarboxylic acid dianhydride.

In one embodiment of the copolyimide, the azobenzenediamine is 4,4'-diaminoazobenzene; the flexible dianhydride is 2,2-bis(phthalic anhydride)-1,1,1,3,3,3-hexafluoroisopropane; and the rigid dianhydride is pyromellitic dianhydride.

The present invention further includes a method for preparing copolyimides comprising the steps of: copolymerizing an azobenzenediamine with at least one rigid dianhydride and at least one flexible dianhydride to generate a copoly(amic acid) precursor solution having the general formula:

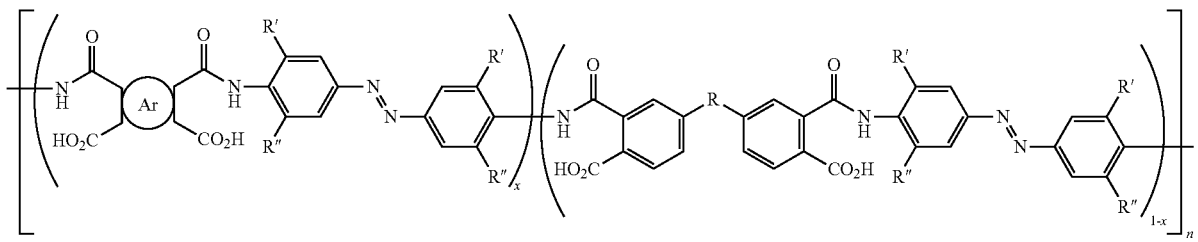

and heat-curing the copoly(amic acid) precursor solution to generate the copolyimide having the general formula:

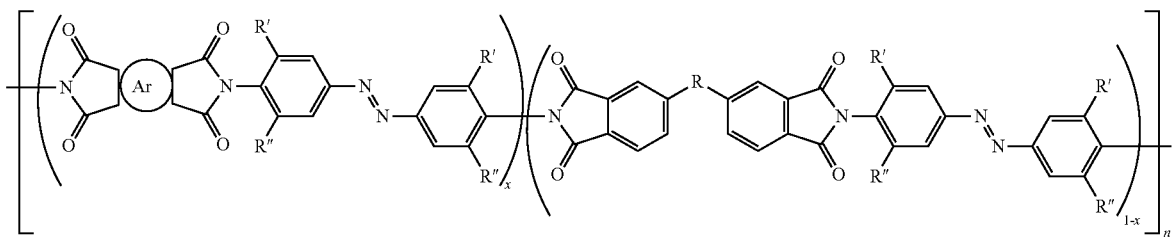

in which Ar is 1,2,4,5-benzene (pyromellitic), 1,4,5,8-naphthalene, and/or 3,3',4,4'-biphenyl; R is —C(CF$_3$)$_2$—, —O—, >C=O, >SO$_2$, —OPh-C(CF$_3$)$_2$—PhO—, —OPh-C(CH$_3$)$_2$—PhO—, >C(CF$_3$)Ph, —O(1,3-Ph)O—, and/or —O(1,4-Ph)O—; when R' and R" are identical, they are —H, —F, —Cl, or —CH$_3$, and when R' and R" are different, R' is —H and R" is —F, —Cl, —CH$_3$, —CF$_3$, and/or —OCH$_3$; and $0 \leq x \leq 1.0$. In one embodiment of the method, n is between 100 and 500. In another embodiment, $0.05 \leq x \leq 0.50$.

The azobenzenediamine may be 4,4'-diaminoazobenzene, 3-fluoro-4,4'-diaminoazobenzene, 3-chloro-4,4'-diaminoazobenzene, 3-methyl-4,4'-diaminoazobenzene, 3-trifluormethyl-4,4'-diaminoazobenzene, 3-methoxy-4,4'-diaminoazobenzene, 3,3'-fluoro-4,4'-diaminoazobenzene, 3,3'-chloro-4,4'-diaminoazobenzene, and/or 3,3'-methyl-4,4'-diaminoazobenzene. The flexible dianhydride may be 2,2-bis(phthalic anhydride)-1,1,1,3,3,3-hexafluoroisopropane, 4,4'-oxydi(phthalic anhydride), 3,3',4,4'-diphenylsulfone tetracarboxylic dianhydride, 3,3',4,4'-benzophenone tetracarboxylic dianhydride, 2,2-bis[4-(3,4-dicarboxyphenoxyl)phenyl]hexafluoropropane dianhydride, 2,2-bis[4-(3,4-dicarboxyphenoxyl)phenyl]propane dianhydride, 4,4'-(2,2,2-trifluoro-1-phenylethylidene)diphthalic anhydride, 2,2'4,4'-(p-phenylenedioxy)diphthalic anhydride, and/or 4,4'-(m-phenylenedioxy)diphthalic anhydride. The rigid dianhydride may be pyromellitic dianhydride, 1,4,5,8-naphthalenetetracarboxylic acid dianhydride, and/or 1,1'-biphenyl-3,3',4,4'-tetracarboxylic acid dianhydride.

In one embodiment of the method, the azobenzenediamine is 4,4'-diaminoazobenzene; the flexible dianhydride is 2,2-bis(phthalic anhydride)-1,1,1,3,3,3-hexafluoroisopropane; and the rigid dianhydride is pyromellitic dianhydride.

DETAILED DESCRIPTION OF THE INVENTION

Figure 1:
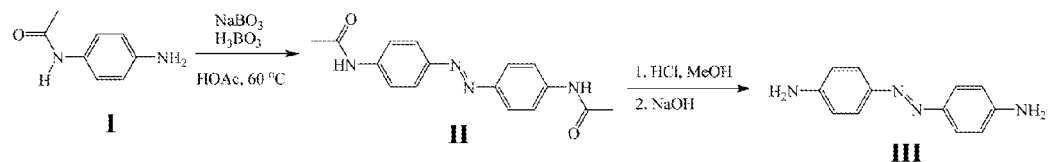
FIG. 1 illustrates an exemplary method of synthesizing 4,4'-diaminoazobenzene.

The present invention includes compositions of azobenzene-containing, photomechanically active, linear copolyimides and methods of making the same. The presently disclosed copolyimides demonstrate excellent photomechanical properties and distinct photomechanical responses such as polarization-controlled forward and reverse bending of a copolyimide cantilever. The present invention further demonstrates that photomechanical properties may be instilled in linear aromatic polyimides (fully imidized form) and that the extent of the photomechanical response may be controlled via the stoichiometric ratios of the rigid dianhydride (DA) and the flexible DA used in the copolymerization process.

According to the present invention, a poly(amic acid) precursor may be formed by the copolymerization of an azobenzenediamine together at room temperature with varying molar ratios of (1) a rigid dianhydride (RDA); (2) a flexible dianhydride (FDA); or (3) both a RDA and a FDA, the poly(amic acid) precursor having the following general structure A:

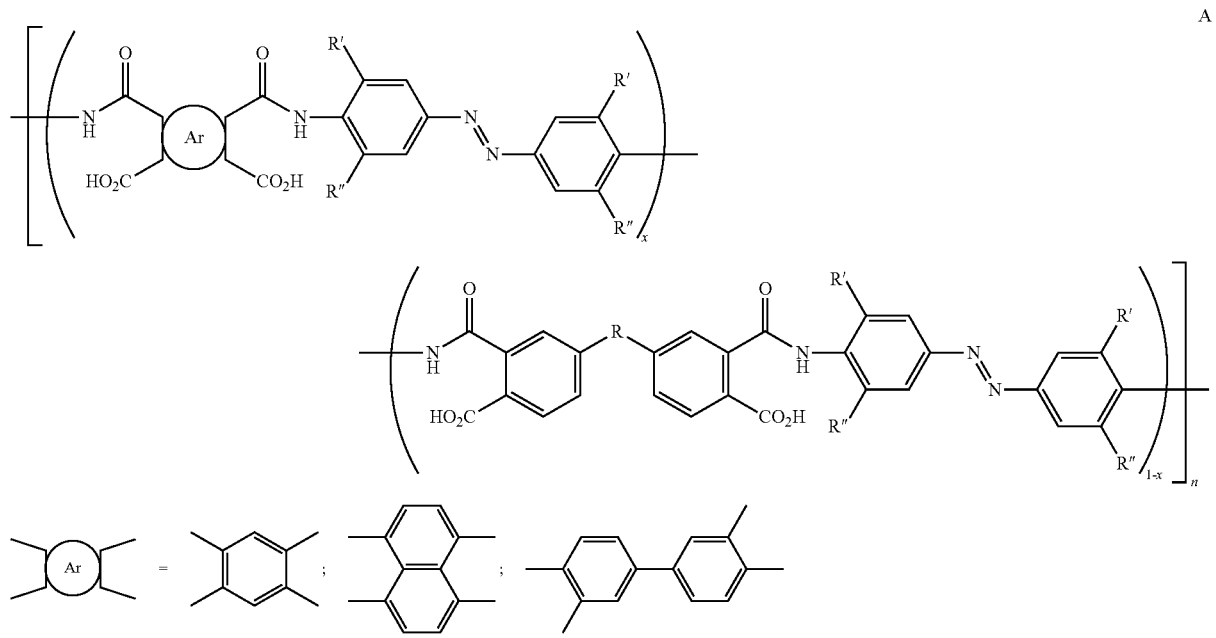

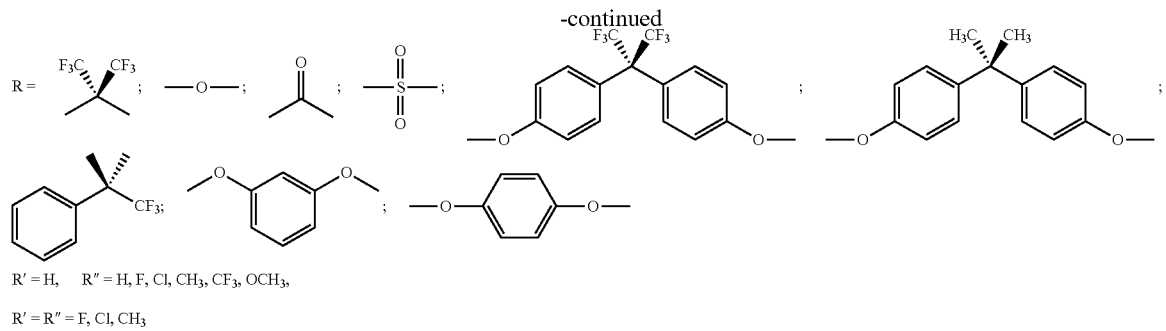

R' = H, R" = H, F, Cl, CH₃, CF₃, OCH₃,

R' = R" = F, Cl, CH₃

Following heat treatment of the poly(amic acid) precursor solution, azobenzene-containing polyimides and copolyimides having the following general structure B may be formed:

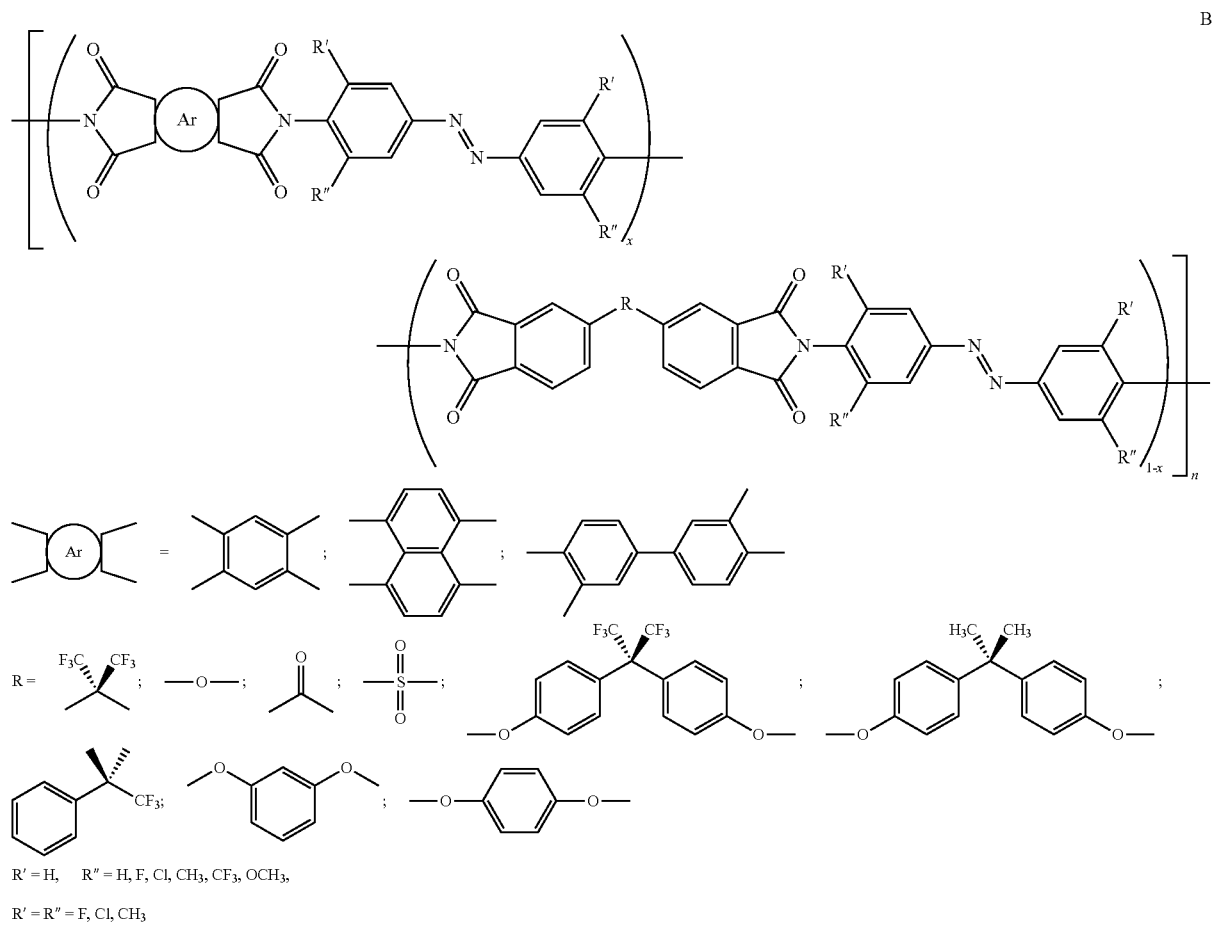

R' = H, R" = H, F, Cl, CH₃, CF₃, OCH₃,

R' = R" = F, Cl, CH₃

In structures A and B, x indicates the mole fraction of the RDA component; 1−x indicates the mole fraction of the FDA component; and n indicates the overall degree of polymerization (DP) of the parent polymers (x=1 for Azo-PI-RDA; x=0 for Azo-PI-FDA) or the co-polymers. The polymers having general structure B are designated throughout as Azo-PI-RDA or Azo-PI-FDA for the "parent" polyimides, and for the associated copolyimides, Azo-coPI-xx, where xx corresponds to the molar fraction (%) of RDA with respect to the FDA in the copolymer. In one embodiment, x is between 0 and 1.0. In another embodiment, 0≤x≤1.0. In a further embodiment, 0.05≤x≤0.50. In another embodiment, n may be between 100 and 500.

In both structures, Ar may be 1,2,4,5-benzene (pyromellitic), 1,4,5,8-naphthalene, and/or 3,3',4,4'-biphenyl. The linking group R may include but is not limited to the following moieties: —C(CF₃)₂—, —O—, >C=O, >SO₂, —OPh-C(CF₃)₂—PhO—, —OPh-C(CH₃)₂—PhO—, >C(CF₃)Ph, —O(1,3-Ph)O—, and/or —O(1,4-Ph)O—. Within the same polymer, R' and R" may be the same moiety, or they may be different. Where R' and R" are the same, they are each —H, —F, —Cl, or —CH$_3$. Where R' and R" are different, R' is —H, and R" is —F, —Cl, —CH$_3$, —CF$_3$, and/or —OCH$_3$.

In structures A and B, the azobenzenediamine may be 4,4'-diaminoazobenzene (DAAB) or a derivative of DAAB, including, but not limited to 3-fluoro-4,4'-diaminoazobenzene; 3-chloro-4,4'-diaminoazobenzene; 3-methyl-4,4'-diaminoazobenzene; 3-trifluormethyl-4,4'-diaminoazobenzene; 3-methoxy-4,4'-diaminoazobenzene; 3,3'-fluoro-4,4'-diaminoazobenzene; 3,3'-chloro-4,4'-diaminoazobenzene, and 3,3'-methyl-4,4'-diaminoazobenzene.

The flexible dianhydride (FDA) may be a bis(phthalic) anhydride having the following general structure:

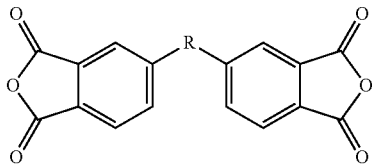

The FDA may be 2,2-bis(phthalic anhydride)-1,1,1,3,3,3-hexafluoroisopropane; 4,4'-oxydi(phthalic anhydride); 3,3', 4,4'-benzophenone tetracarboxylic dianhydride; 3,3',4,4'-diphenylsulfone tetracarboxylic dianhydride; 2,2-bis[4-(3,4-dicarboxyphenoxyl)phenyl]hexafluoropropane dianhydride; 2,2-bis[4-(3,4-dicarboxyphenoxyl)phenyl]propane dianhydride; 4,4'-(2,2,2-trifluoro-1-phenylethylidene)diphthalic anhydride; 2,2',4,4'-(p-phenylenedioxy)diphthalic anhydride; and/or 4,4'-(m-phenylenedioxy)diphthalic anhydride.

The RDA may be selected from the following aromatic dianhydrides: pyromellitic dianhydride; 1,4,5,8-naphthalenetetracarboxylic acid dianhydride; and/or 1,1'-biphenyl-3, 3',4,4'-tetracarboxylic acid dianhydride.

DAAB (III) may be synthesized as shown in FIG. 1 and described below in Example 1. In one embodiment, DAAB may be combined with a RDA such as pyromellitic dianhydride (PMDA) to form an Azo-PI-PMDA polyimide as described below in Example 2. In another embodiment, DAAB may be combined with a FDA such as 2,2-bis(phthalic anhydride)-1,1,1,3,3,3-hexafluoroisopropane (6FDA) to form an Azo-PI-6FDA polyimide as described below in Example 3.

In a further embodiment, DAAB may be combined in various stoichiometric ratios with a RDA and a FDA to form an Azo-coPI-xx copolyimide. For example, as described below in Example 4 and shown in FIG. 2, PMDA (IV) and 6FDA (V) are mixed to form a copoly(amic acid) precursor solution (PAA solution, VI), and after heat treatment of the PAA solution (VI), copolyimides comprising PMDA-DAAB-6FDA (VII) in varying molar ratios may be prepared.

The present invention further includes methods of making copolyimides comprising the steps of copolymerizing an azobenzenediamine with a rigid dianhydride and a flexible dianhydride to generate a copoly(amic acid) precursor solution having the following general structure A:

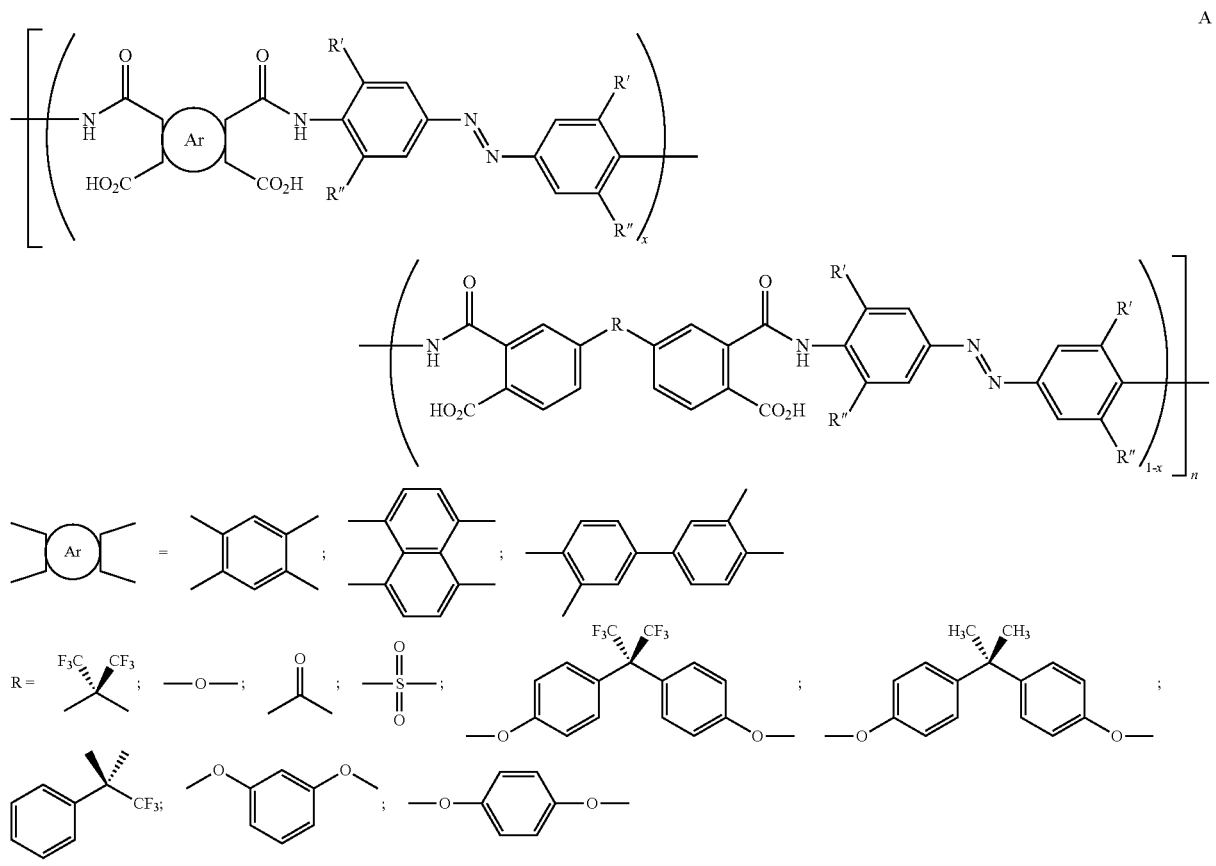

and curing the copoly(amic acid) precursor solution using heat to generate a copolyimide having the following general structure B:

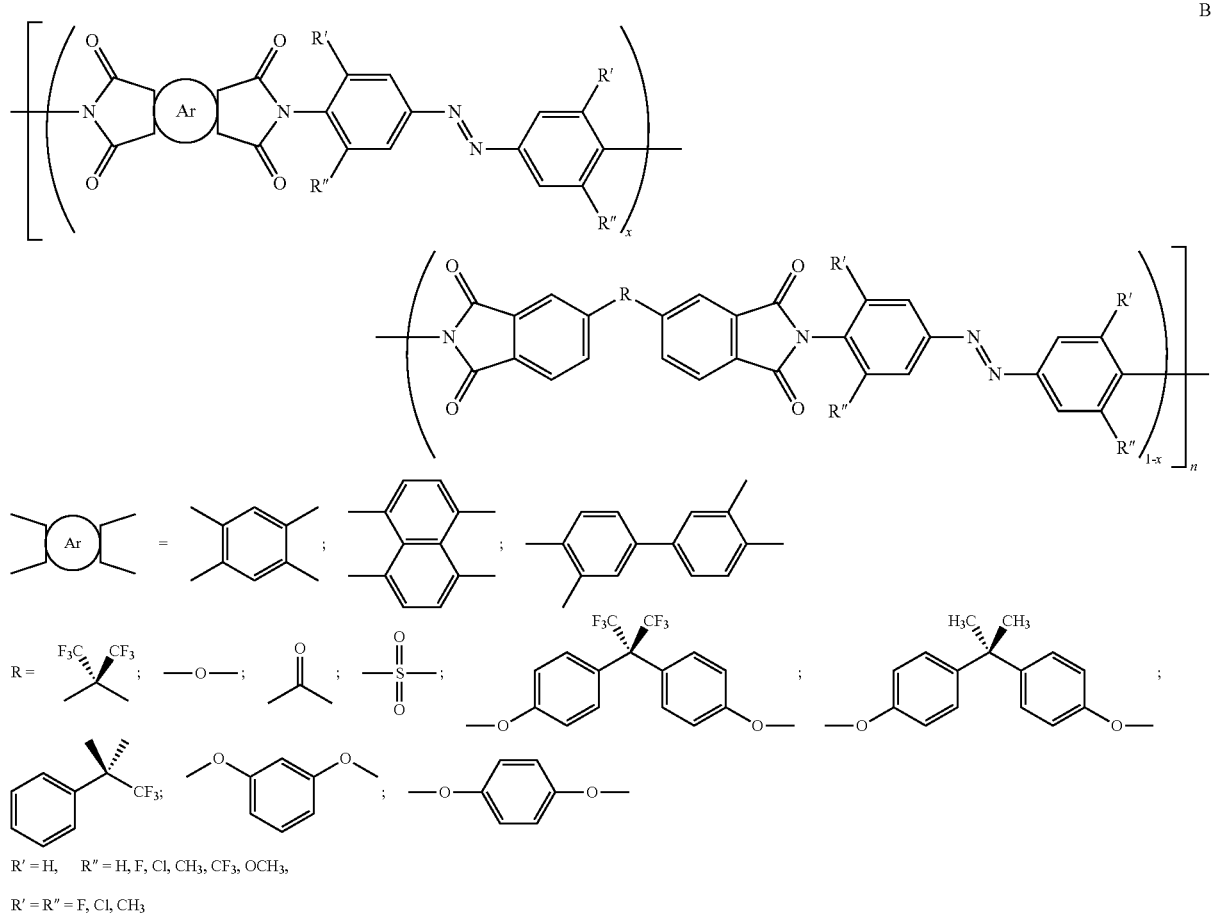

In structures A and B, x indicates the mole fraction of the RDA component; 1−x indicates the mole fraction of the FDA component; and n indicates the overall DP of the parent polymers (x=1 for Azo-PI-RDA; x=0 for Azo-PI-FDA) or the co-polymers. In one embodiment of the method, x is between 0 and 1.0. In another embodiment, 0≤x≤1.0. In a further embodiment, 0.05≤x≤0.50. In another embodiment, n may be between 100 and 500. In both structures, Ar may be 1,2,4,5-benzene (pyromellitic), 1,4,5,8-naphthalene, and/or 3,3',4,4'-biphenyl. The linking group R may include but is not limited to the following moieties: —C(CF$_3$)$_2$—, —O—, >C=O, >SO$_2$, —OPh-C(CF$_3$)$_2$—PhO—, —OPh-C(CH$_3$)$_2$—PhO—, >C(CF$_3$)Ph, —O(1,3-Ph)O—, and/or —O(1,4-Ph)O—. Within the same polymer, R' and R" may be the same moiety, or they may be different. Where R' and R" are the same, they are each —H, —F, —Cl, or —CH$_3$. Where R' and R" are different, R' is —H, and R" is —F, —Cl, —CH$_3$, —CF$_3$, and/or —OCH$_3$.

In structures A and B, the azobenzenediamine used in the method of making copolyimides may be 4,4'-diaminoazobenzene (DAAB) or a derivative of DAAB, including, but not limited to 3-fluoro-4,4'-diaminoazobenzene; 3-chloro-4,4'-diaminoazobenzene; 3-methyl-4,4'-diaminoazobenzene, 3-trifluormethyl-4,4'-diaminoazobenzene; 3-methoxy-4,4'-diaminoazobenzene; 3,3'-fluoro-4,4'-diaminoazobenzene; 3,3'-chloro-4,4'-diaminoazobenzene; and 3,3'-methyl-4,4'-diaminoazobenzene.

The flexible dianhydride (FDA) may be a bis(phthalic) anhydride having the following general structure:

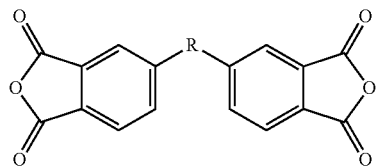

The FDA may be 2,2-bis(phthalic anhydride)-1,1,1,3,3,3-hexafluoroisopropane; 4,4'-oxydi(phthalic anhydride); 3,3',4,4'-benzophenone tetracarboxylic dianhydride; 3,3',4,4'-diphenylsulfone tetracarboxylic dianhydride; 2,2-bis[4-(3,4-dicarboxyphenoxyl)phenyl]hexafluoropropane dianhydride; 2,2-bis[4-(3,4-dicarboxyphenoxyl)phenyl]propane dianhydride; 4,4'-(2,2,2-trifluoro-1-phenylethylidene)diphthalic anhydride; 2,2',4,4'-(p-phenylenedioxy)diphthalic anhydride; and/or 4,4'-(m-phenylenedioxy)diphthalic anhydride.

The RDA may be selected from the following aromatic dianhydrides: pyromellitic dianhydride; 1,4,5,8-naphthalenetetracarboxylic acid dianhydride; and/or 1,1'-biphenyl-3,3',4,4'-tetracarboxylic acid dianhydride.

The following examples and methods are presented as illustrative of the present invention or methods of carrying out the invention, and are not restrictive or limiting of the scope of the invention in any manner. Referring to the drawings, like reference numerals may designate like or corresponding parts throughout the several views.

Example 1

Synthesis of 4,4'-Diaminoazobenzene (DAAB)

4,4'-diaminoazobenzene (DAAB, III) is synthesized via a two-step route shown in FIG. 1. Glacial acetic acid (500 mL), 4'-aminoacetanilide (I) (29.0 g, 0.19 mol), sodium perborate tetrahydrate (40 g, 0.26 mol) and boric acid (10 g, 0.16 mol) are added to a 1 L three-necked round-bottomed flask equipped with a magnetic stir bar, a condenser, and a thermometer. The mixture is heated with stirring to 50-60° C. and held at this temperature for 6 hours. After the mixture is allowed to cool to room temperature, the yellow product is collected on a Büchner funnel and washed with water until the washings are neutral as indicated by pH paper. The product is then dried in a vacuum oven at 110° C. to afford 16.7 g. (58%) of 4,4'-bis(acetamido)azobenzene (II), m.p. 289.4-290.0° C. (dec.). $^1$H-NMR (DMSO-$d_6$, $\delta$ in ppm): 2.08 (s, 6H, $CH_3$), 7.76-7.83 (m, 8H, Ar—H), 10.25 (s, 2H, NH).

Without further purification, 4,4'-bis(acetamido)azobenzene (II) (16.0 g, 0.054 mol) is placed in a 500-mL round-bottomed flask equipped with a condenser and a magnetic stirrer, along with methanol (150 mL) and 6N hydrochloric acid (150 mL). The mixture is heated under reflux for 1.5 hours. The reaction mixture is cooled, and the violet solid is collected on a Büchner funnel. The mixture is heated under reflux for 1.5 hours. The reaction mixture is cooled, and the violet solid collected on a Büchner funnel. The damp product is suspended in 500 mL of water in a 1 L beaker equipped with a stirrer, and the mixture is slowly neutralized by the addition of 2.5N sodium hydroxide, during which the salt dissolves and the free base separates. The crude product is collected on a Büchner funnel, washed with water, and dried under reduced pressure. The yellow powder is then recrystallized from N-methylpyrrolidinone to afford yellow crystals of DAAB (III) (8.8 g, 42%), m.p. 244.5-247.9° C. (dec.). FT-IR (KBr, $cm^{-1}$): 3417, 3333, 3212 ($NH_2$), 3040, 1627, 1592, 1502, 1294, 1150, 839. $^1$H-NMR (DMSO-$d_6$, $\delta$ in ppm): 5.72 (s, 4H, $NH_2$), 6.61-6.63 (d, 4H, Ar—H), 7.51-7.53 (d, 4H, Ar—H). $^{13}$C-NMR (DMSO-$d_6$, $\delta$ in ppm): 113.4, 123.7, 143.1, 150.9. Purification of (III) by column chromatography met with limited success due to its poor solubility in most organic solvents.

Example 2

Synthesis of PMDA-DAAB Polyimide (Azo-PI-PMDA)

Figure 2:
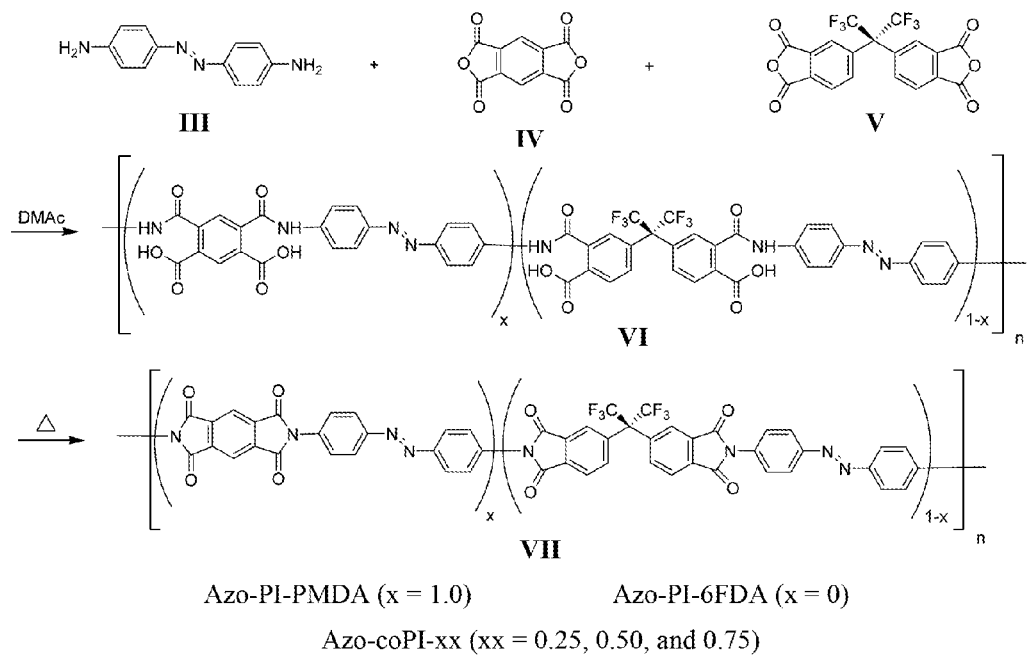
FIG. 2 illustrates an exemplary method of synthesizing azobenzene-containing copolyimides.

As shown in FIG. 2, DAAB (III) (0.8490 g, 4.000 mmol) and dimethylacetamide (DMAc) (12 mL) are added to a 50 mL 3-necked flask equipped with a magnetic stirrer and nitrogen inlet and outlet and stirred under dry nitrogen at room temperature for 30 minutes. Pyromellitic dianhydride (PMDA, IV) (0.8725 g, 4.000 mmol) is then charged. The dark red solution is agitated at room temperature for 24 hours to afford a viscous poly(amic acid) precursor solution (PAA solution, VI). The PAA solution (VI) is diluted with additional DMAc (6 mL) and poured into a glass dish, followed by vacuum evaporation of the DMAc at 50° C. and heat-treatment on the following schedule: 100° C./2 hours, 150° C./2 hours, 175° C./1 hour, 200° C./2 hours, 250° C./1 hour, and 300° C./1 hour to form imidized polymers (VII, x=1.0). The film thickness is approximately 20-100 μm. FT-IR (KBr, $cm^{-1}$): 3070, 1778, 1709, 1598, 1360, 1114, 1088, 821, 717, 551.

Example 3

Synthesis of 6FDA-DAAB Polyimide (Azo-PI-6FDA)

Using the same procedure as described above in Example 2 and shown in FIG. 2, a 6FDA-DAAB polyimide (VII, x=0) is prepared from DAAB (III) (0.8490 g, 4.000 mmol), 2,2-bis (phthalic anhydride)-1,1,1,3,3,3-hexafluoroisopropane (6FDA, V) (1.777 g, 4.000 mmol), and DMAc (18 mL). The film thickness is approximately 20-100 μm. FT-IR (KBr, $cm^{-1}$): 3072, 1785, 1720, 1600, 1498, 1356, 1251, 1189, 1141, 1080, 838, 719.

Example 4

Synthesis of Azobenzene-Containing Copolyimides (PMDA:6FDA=50:50, Azo-coPI-50)

As shown in FIG. 2, DAAB (III) (0.8490 g, 4.000 mmol) and DMAc (12 mL) are added to a 50 mL, 3-necked flask equipped with a magnetic stirrer and nitrogen inlet and outlet and stirred under dry nitrogen at room temperature for 30 minutes. PMDA (IV) (0.4362 g, 2.000 mmol) and 6FDA (V) (0.8888 g, 2.000 mmol) are then charged. The dark red solution is agitated at room temperature for 24 hours to afford a viscous copoly(amic acid) precursor solution (PAA, VI). The PAA solution (VI) is diluted with DMAc (6 mL) and poured into a glass dish, followed by vacuum evaporation of DMAc at 50° C. and heat-treatment on the following schedule: 100° C./2 hours, 150° C./2 hours, 175° C./1 hour, 200° C./2 hours, 250° C./1 hour, and 300° C./1 hour to form the imidized polymers (VII, Azo-coPI-50, x=0.50). The film thickness is approximately 20-100 μm. FT-IR (KBr, $cm^{-1}$): 3071, 1779, 1717, 1599, 1498, 1352, 1298, 1252, 1207, 1189, 1143, 1111, 1082, 914, 891, 528.

Example 5

Physical Characterization of Polyimide and Copolyimide Films

Density Determination

The density of each polymer film is determined based on Davy's principle of hydrostatic suspension using a mixture of carbon tetrachloride and ethanol as the suspension medium. Small pieces of azopolyimide film are suspended individually in a mixture of carbon tetrachloride and methanol in a 10 mL graduated cylinder, which had previously been tared. The total solvent volume is between 9.4 and 10 mL, and the films re suspended around the 5 mL mark when the solvent is weighed. The mass of the solution and the total volume are used to calculate a density. The films did not swell in the solvent mixture. The resulting density values for the azopolyimide films are summarized in Table 1 below.

Crystallinity

The degree of crystallinity (crystallinity index) is determined by deconvoluting the wide-angle x-ray diffraction (WAXD) patterns into individual diffraction peaks (data not shown). The percent crystallinity ($P_c$) measurements are listed below in Table 1 for polyimides Azo-PI-PMDA and Azo-PI-6FDA and copolyimides Azo-coPI-xx comprising varying ratios of PMDA:6FDA. The Azo-PI-PMDA sample is a semicrystalline azopolyimide with a repeat unit of approximately 17.9 Å based on the WAXD diffraction, which is same as that calculated for the imide unit in the trans configuration. The presence of four orders of the repeat unit in the Azo-PI-PMDA sample indicates that the system is highly ordered. On the other hand, the Azo-PI-6FDA sample is totally amorphous. As 6FDA content increases, the azopolyimide films change from semi-crystalline ($P_c$=15.3, 35.5) to slightly semicrystalline ($P_c$=2.5, 2.6) to amorphous ($P_c$=0). As further shown in Example 6 and Table 1 below, the density and $T_g$ decrease with an increase in the 6FDA content, which is indicative of the increasing trend in the free volume for this series of copolyimides.

Dynamic Mechanical Analysis (DMA)

DMA of the polyimide and copolyimide films is conducted in a nitrogen atmosphere with a heating rate of 4° C./min on a TA Instruments® DMA Q400EM to obtain the glass transition temperature and the storage modulus. The glass transition temperature ($T_g$) is measured from the peak value of the tan δ curve. The DMA results are summarized in Table 1 below.

Thermogravimetric Analysis (TGA)

Thermal stability of the polyimides and copolyimides is studied by TGA. The films are heated in both nitrogen and air with a heating rate of 10° C./min. The polymers show excellent short-term thermal/thermo-oxidative stability. No thermal or thermo-oxidative degradation is observed up to 450° C. in air and 420° C. in nitrogen atmosphere (results not shown).

UV Absorption Analysis

UV-vis absorption analysis is conducted for thin films of polyimides and copolyimides (data not shown). The Azo-PI-6FDA film shows a well-defined absorption transition ?$_{max}$ at 340 nm. However, the Azo-PI-PMDA film and Azo-coPI-50 and Azo-coPI-75 copolyimide films all show broad absorption bands centered around 350 nm and visible absorption bands tailing into approximately 600 nm, which is attributable to charge-transfer complexation absorptions that result in the orange-red color of the films.

Example 6

Photomechanical Characterization of Polyimide and Copolyimide Cantilevers

Figure 3:
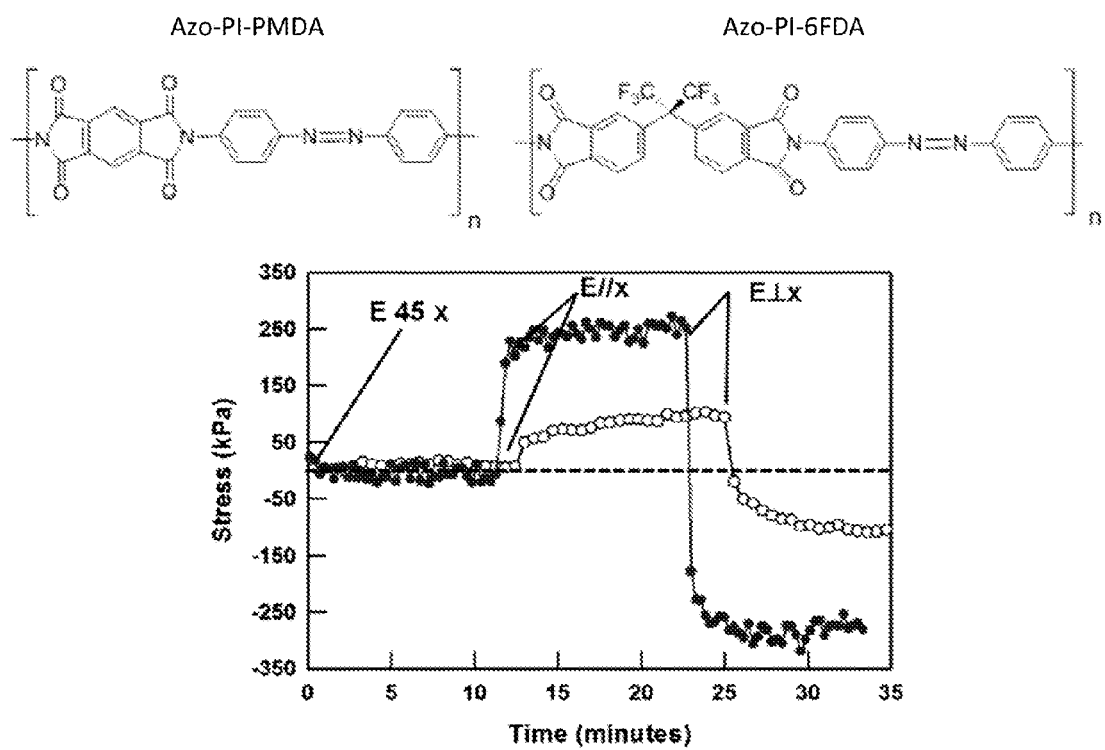
FIG. 3 is a plot illustrating the stress response of Azo-PI-6FDA (●) and Azo-PI-PMDA (○) films (5.0×0.5×0.02 mm cantilevers) upon irradiation with 100 mW/cm$^2$ of 442 nm light that is polarized 45°, parallel to, and orthogonal to the long axis of the cantilever.
Figure 4A:
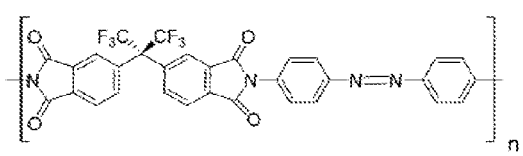
FIGS. 4A and 4B demonstrate the polarization-dependent photomechanical response of an Azo-PI-6FDA film and an Azo-PI-PMDA film (5.0×0.5×0.02 mm cantilevers), respectively, upon irradiation with 100 mW/cm$^2$ of 442 nm and 488 nm light that is polarized 45°, parallel to, and orthogonal to the long axis of the cantilever.
Figure 4B:
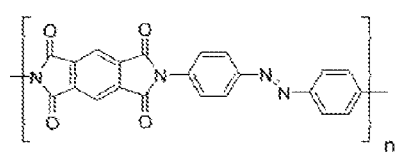
Figure 4B:
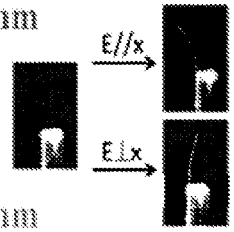
Figure 4B:
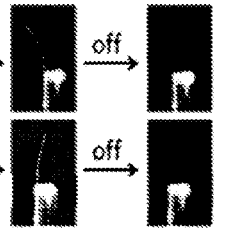
Figure 4B:
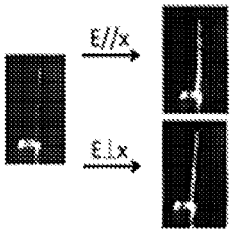
Figure 4B:
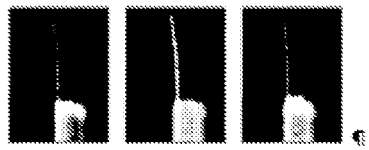

For all photomechanical benchmarking experiments, azopolyimide films in the form of cantilevers are held at approximately the same distance from a source of light. The employed is blue-green irradiation, which allows all-optical control of forward and reverse bending (or contractile and expansive stress) by adjusting the orientation of the linear polarization of the irradiating light. Blue-green irradiation is also known to induce trans-cis-trans reorientation of azobenzene chromophores The photomechanical response is first examined in tension by placing cantilevers comprising Azo-PI-6FDA and Azo-PI-PMDA (6.0×1.0×0.02 mm) in a strain-controlled dynamic mechanical analyzer (TA Instruments® RSA III). To ensure no slack during testing, the films are held with 4×10$^{-5}$% strain to pretension the film. The materials are irradiated with light from an Argon-ion laser beam that is polarized 45° (E45x), parallel (E//x) to, or orthogonal (E⊥x) to the long axis of cantilever. FIG. 3 is a plot illustrating the stress response of an Azo-PI-6FDA (●) and an Azo-PI-PMDA (○) cantilever upon irradiation with 100 mW/cm$^2$ of 442 nm light, in which the polarization is aligned 45°, parallel to, and orthogonal to the long axis of the cantilever. Both materials generate little or no stress upon exposure to light polarized 45° to the long axis of the cantilever. However, when the polarization is rotated (under continuous irradiation) such that it is parallel to the long axis of the cantilever, the Azo-PI-6FDA film shows approximately three times the amount of contractile stress compared to its Azo-PI-PMDA film counterpart (260 kPa vs. 100 kPa, respectively). Rotation of the polarization so that is orthogonal (once again, under continuous irradiation) to the long axis of the cantilever results in expansive stress of 265 kPa for the Azo-PI-6FDA film and 105 kPa for the Azo-PI-PMDA film. In contrast to previous examinations of stress in azo-LCN materials upon exposure to blue-green irradiation, the stress of approximately 260 kPa is an order of magnitude enhancement. This higher photomechanical motion for the Azo-PI-6FDA film may be attributed to its amorphous structure as well as its lower density and $T_g$ (see Table 1 below).

Figure 5:
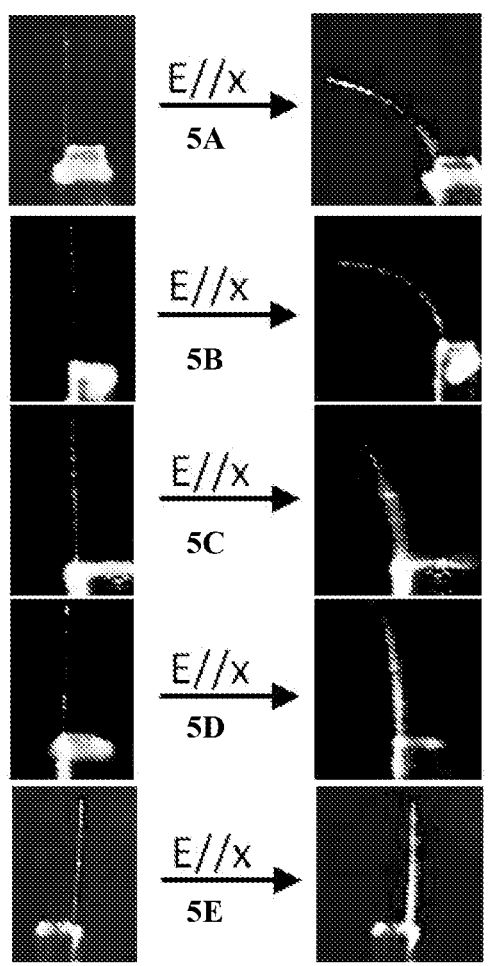
FIGS. 5A-5E demonstrate the photo-directed bending of polyimide and copolyimide films (6.0×1.0×0.02 mm cantilevers) comprising varying ratios of PMDA:6FDA:DAAB in response to 442 nm light that is polarized parallel to the long axis of the cantilever.
Figure 6:
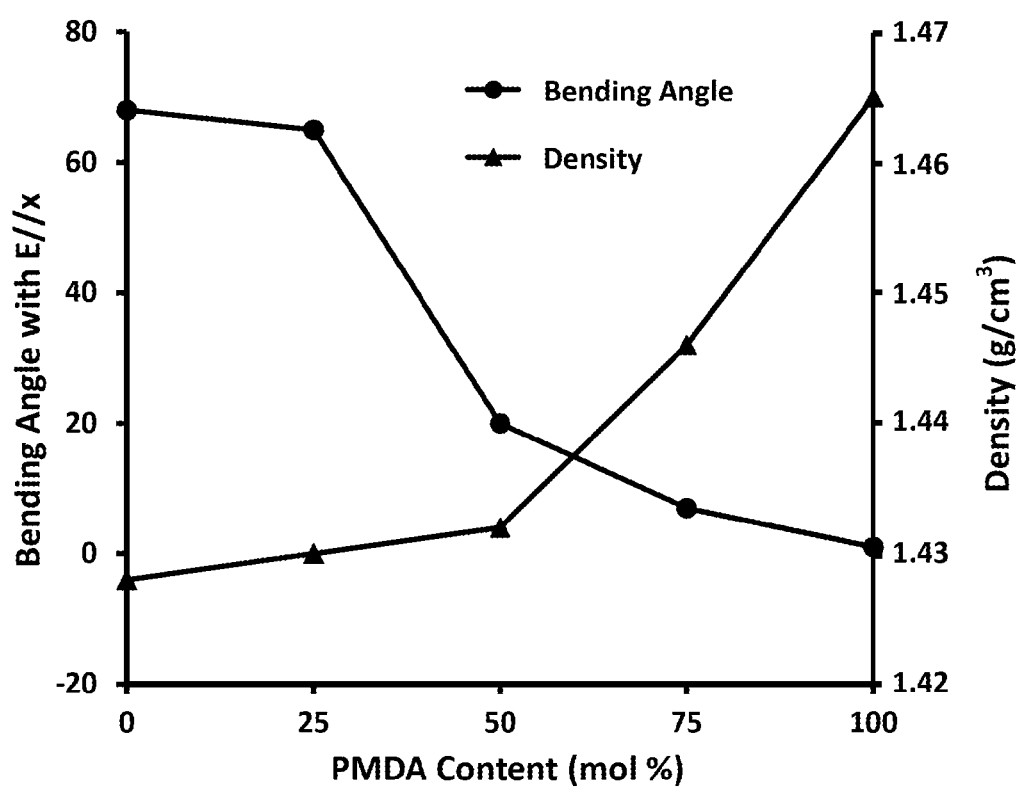
FIG. 6 illustrates the relationship between the PMDA content and the bending angle demonstrated in the polyimide and copolyimide films of FIGS. 5A-5E.

FIGS. 4-6 illustrate the photomechanical response of azopolyimide films without tension. As shown in FIGS. 4A and 4B, Azo-PI-6FDA and Azo-PI-PMDA exhibit similar photoresponse trends upon exposure to linearly polarized 442 nm as compared to 488 nm irradiation. Both cantilevers (5.0× 0.5×0.02 mm) are initially exposed to blue-green light polarized 45° (E45x) to the long axis of the cantilever. Consistent with the stress response curves in FIG. 3, almost no bending is observed for either material upon irradiation with 442 or 448 nm light polarized 45° to the axis. Upon exposure to light polarized parallel to or orthogonal to the long axis of cantilever, the Azo-PI-6FDA film (FIG. 4A) exhibits bidirectional movement, bending 26° in approximately 60 minutes (E//x) and bending the other direction to –15° (E⊥x). Although FIG. 3 indicates that irradiation of the Azo-PI-PMDA film with light parallel to and orthogonal to the cantilever axis does generate stress, the Azo-PI-PMDA film (FIG. 4B) remains largely unresponsive at both wavelengths in terms of bending angle.

FIGS. 5A-E illustrate the photo-directed bending of polyimides and copolyimide films (5.0×1.0×0.02 mm cantilevers) comprising varying ratios of PMDA:6FDA:DAAB in response to 442 nm light that is polarized parallel to the long axis of the cantilevers, while FIG. 6 illustrates the relationship between PMDA content and the radiation of curvature (bending angle) of the polyimide and copolyimide cantilevers of FIGS. 5A-E. In general, the bending angle increases with 6FDA content. While the Azo-PI-PMDA film (5E) bends very slightly, the bending angles increase with 6FDA content to 7° for 25% 6FDA (5D), 20° for 50% 6FDA (5C), 65° for 75% 6FDA (5B), and 68° for 100% 6FDA (5A), which is reflected in the plots in FIG. 6 (see also Table 1 below). Incorporation of increasing amounts of the more flexible 6FDA units into the polymer chains results in higher free volume and, in turn, higher bending angles. This flexibility of the 6FDA molecules makes them less inclined to form interchain charge-transfer complexation, which further accounts for the higher bending angles. In addition, comparison of the results obtained from physical characterization of the azopolyimide films with the photomechanical results reveals that the bending angle is independent of the modulus. The modulus increases as crystallinity increases, which should result in an increase in photogenerated stress and thus an increase in bending angle. However, as seen in FIGS. 3-6, the opposite result occurs. Increasing crystallinity reduces the ability of the macromolecular system to translate light into work, indicating the complex relationship of crystallinity, polymer content, and polymer network morphology and their effect on the efficacy of photoisomerization and resulting photomechanical response.

The physical properties of the azobenzene-containing polyimides and copolyimides according to the present invention are summarized below in Table 1. In general, the $T_g$ value and storage modulus of the presently disclosed azopolyimides greatly exceed those of previously examined glassy azo-LCN materials, as well as crosslinked, azobenzene-functionalized polyimides. In particular, the azopolyimides comprising a higher percentage of 6FDA demonstrated superior photoresponsivity and ability to translate light into work.

TABLE 1

Composition and Physical Properties of Azobenzene-Containing Polyimides and Copolyimides

| | DAAB (mol %) | PMDA (mol %) | 6FDA (mol %) | ρ (g/cm$_3$) | $T_g$ (° C.) | E' (GPa) | $P_c$ (%) | Bending Angle (E//x,°) |
|---|---|---|---|---|---|---|---|---|
| Azo-PI-6FDA | 50 | 0 | 50 | 1.428 | 362 | 3.80 | 0 | 68 |
| Azo-coPI-25 | 50 | 12.5 | 37.5 | 1.430 | 373 | 3.87 | 2.5 | 65 |
| Azo-coPI-50 | 50 | 25 | 25 | 1.432 | 379 | 4.12 | 2.6 | 20 |
| Azo-coPI-75 | 50 | 37.5 | 12.5 | 1.446 | 411 | 4.94 | 15.3 | 7 |
| Azo-PI-PMDA | 50 | 50 | 0 | 1.465 | >450 | 6.12 | 35.5 | 1 |

Although this invention has been described with respect to certain preferred embodiments, various other embodiments and various changes and modifications to the disclosed embodiment(s) will become apparent to those skilled in the art. All such other embodiments, changes, and modifications are intended to come within the spirit and scope of the appended claims

What is claimed is:

1. A copolyimide having photomechanical properties and comprising an azobenzenediamine, a rigid dianhydride, and a flexible dianhydride, the copolyimide having the general formula:

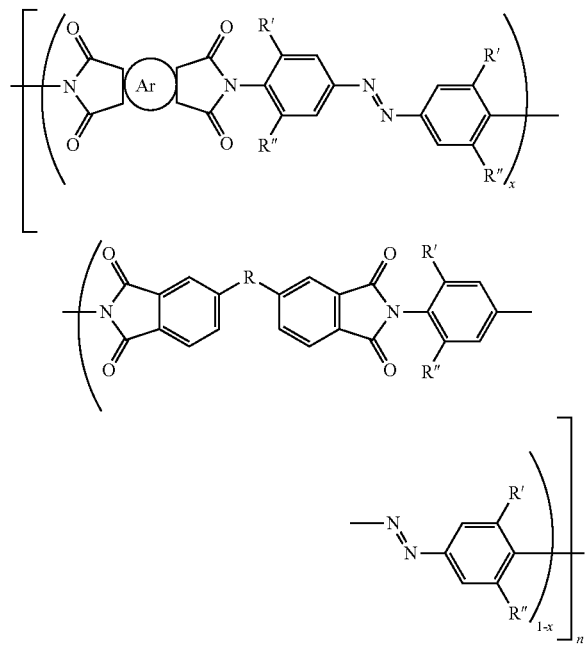

wherein Ar is at least one of 1,2,4,5-benzene (pyromellitic), 1,4,5,8-naphthalene, and 3,3',4,4'-biphenyl; wherein R is at least one of —C(CF$_3$)$_2$—, —O—, >C=O, >SO$_2$, —OPh-C(CF$_3$)$_2$—PhO—, —OPh-C(CH$_3$)$_2$—PhO—, >C(CF$_3$)Ph, —O(1,3-Ph)O—, and —O(1,4-Ph)O—;

wherein R' and R" are —H, —F, —Cl, or —CH$_3$ when R' and R" are identical, or wherein R' is —H and R" is at least one of —F, —Cl, —CH$_3$, —CF$_3$, and —OCH$_3$ when R' and R" are different; and wherein 0.05≤x≤0.50.

2. The copolyimide of claim 1 wherein n is between 100 and 500.

3. The copolyimide of claim 1 wherein the azobenzenediamine comprises at least one of 4,4'-diaminoazobenzene; 3-fluoro-4,4'-diaminoazobenzene; 3-chloro-4,4'-diaminoazobenzene; 3-methyl-4,4'-diaminoazobenzene; 3-trifluormethyl-4,4'-diaminoazobenzene; 3-methoxy-4,4'-diaminoazobenzene; 3,3'-fluoro-4,4'-diaminoazobenzene; 3,3'-chloro-4,4'-diaminoazobenzene; or 3,3'-methyl-4,4'-diaminoazobenzene.

4. The copolyimide of claim 1 wherein the flexible dianhydride comprises at least one of 2,2-bis(phthalic anhydride)-1,1,1,3,3,3-hexafluoroisopropane; 4,4'-oxydi(phthalic anhydride); 3,3',4,4'-diphenylsulfone tetracarboxylic dianhydride; 3,3',4,4'-benzophenone tetracarboxylic dianhydride; 2,2-bis[4-(3,4-dicarboxyphenoxyl)phenyl]hexafluoropropane dianhydride; 2,2-bis[4-(3,4-dicarboxyphenoxyl)phenyl]propane dianhydride; 4,4'-(2,2,2-trifluoro-1-phenylethylidene)diphthalic anhydride; 2,2'4,4'-(p-phenylenedioxy)diphthalic anhydride; or 4,4'-(m-phenylenedioxy)diphthalic anhydride.

5. The copolyimide of claim 1 wherein the rigid dianhydride comprises at least one of pyromellitic dianhydride; 1,4,5,8-naphthalenetetracarboxylic acid dianhydride; or 1,1'-biphenyl-3,3',4,4'-tetracarboxylic acid dianhydride.

6. The copolyimide of claim 1 wherein the azobenzenediamine is 4,4'-diaminoazobenzene, the flexible dianhydride is 2,2-bis(phthalic anhydride)-1,1,1,3,3,3-hexafluoroisopropane, and the rigid dianhydride is pyromellitic dianhydride.

7. A method for preparing the copolyimide of claim 1, comprising:

copolymerizing the azobenzenediamine with the rigid dianhydride and the flexible dianhydride to generate a copoly(amic acid) precursor having the general formula:

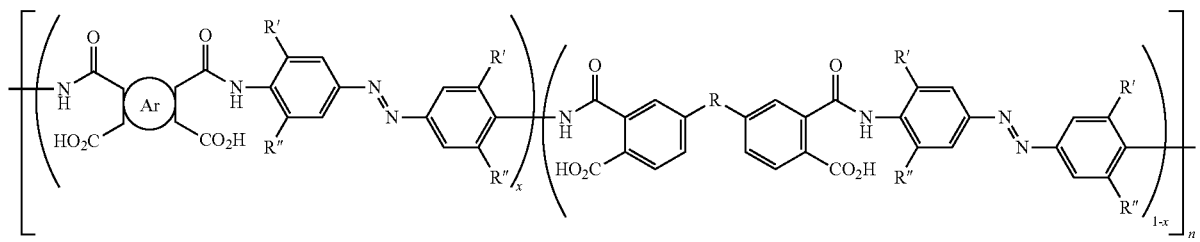

and heat-curing the copoly(amic acid) precursor to generate the copolyimide of claim 1.

8. The method of claim 7 wherein n is between 100 and 500.

9. The method of claim 7 wherein the azobenzenediamine comprises at least one of 4,4'-diaminoazobenzene; 3-fluoro-4,4'-diaminoazobenzene; 3-chloro-4,4'-diaminoazobenzene; 3-methyl-4,4'-diaminoazobenzene; 3-trifluormethyl-4,4'-diaminoazobenzene; 3-methoxy-4,4'-diaminoazobenzene; 3,3'-fluoro-4,4'-diaminoazobenzene; 3,3'-chloro-4,4'-diaminoazobenzene; or 3,3'-methyl-4,4'-diaminoazobenzene.

10. The method of claim 7 wherein the flexible dianhydride comprises at least one of 2,2-bis(phthalic anhydride)-1,1,1,3,3,3-hexafluoroisopropane; 4,4'-oxydi(phthalic anhydride); 3,3',4,4'-diphenylsulfone tetracarboxylic dianhydride; 3,3',4,4'-benzophenone tetracarboxylic dianhydride; 2,2-bis[4-(3,4-dicarboxyphenoxy)phenyl]hexafluoropropane dianhydride; 2,2-bis[4-(3,4-dicarboxyphenoxyl)phenyl]propane dianhydride; 4,4'-(2,2,2-trifluoro-1-phenylethylidene)diphthalic anhydride; 2,2'4,4'-(p-phenylenedioxy)diphthalic anhydride; or 4,4'-(m-phenylenedioxy)diphthalic anhydride.

11. The method of claim 7 wherein the rigid dianhydride comprises at least one of pyromellitic dianhydride; 1,4,5,8-naphthalenetetracarboxylic acid dianhydride; or 1,1'-biphenyl-3,3',4,4'-tetracarboxylic acid dianhydride.

12. The method of claim 7 wherein the azobenzenediamine is 4,4'-diaminoazobenzene, the flexible dianhydride is 2,2-bis(phthalic anhydride)-1,1,1,3,3,3-hexafluoroisopropane, and the rigid dianhydride is pyromellitic dianhydride.

13. A copolyimide having photomechanical properties and comprising a 4,4'-diaminoazobenzene, 2,2-bis(phthalic anhydride)-1,1,1,3,3,3-hexafluoroisopropane, and pyromellitic dianhydride, and having a general formula:

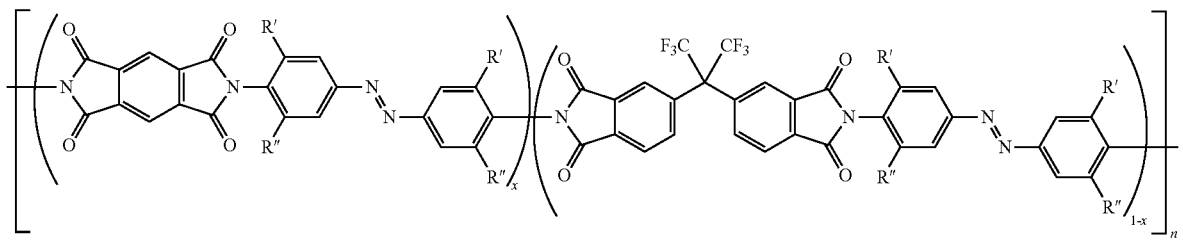

wherein R' and R" are —H, —F, —Cl, or —CH₃ when R' and R" are identical, or wherein R' is —H and R" is at least one of —F, —Cl, —CH₃, —CF₃, and —OCH₃ when R' and R" are different; and wherein $0.05 \leq x \leq 0.50$.

14. A copoly(amic acid) of claim 1, further comprising a 4,4'-diaminoazobenzene; 2,2-bis(phthalic anhydride)-1,1,1,3,3,3-hexafluoroisopropane; and pyromellitic dianhydride, the copoly(amic acid) having a general formula:

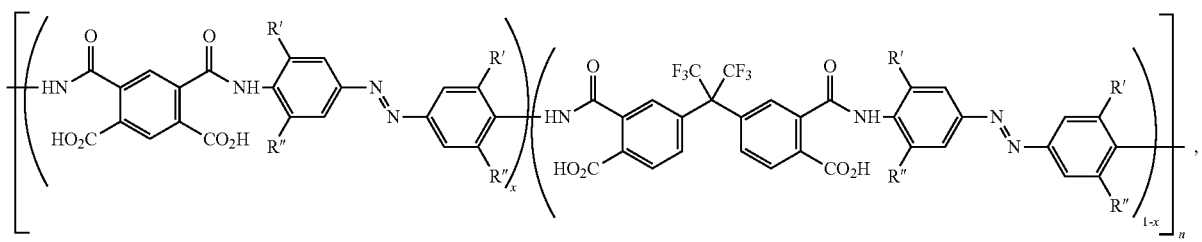

wherein R' and R" are —H, —F, —Cl, or —CH$_3$ when R' and R" are identical, or wherein R' is —H and R" is at least one of —F, —Cl, —CH$_3$, —CF$_3$, and —OCH$_3$ when R' and R" are different;

wherein $0.05 \leq x \leq 0.50$ and wherein $100 \leq n \leq 500$.

\* \* \* \* \*